(12) United States Patent
Tatarinov

(10) Patent No.: US 11,803,393 B2
(45) Date of Patent: Oct. 31, 2023

(54) SYSTEMS AND METHODS FOR AUTOMATIC SERVICE ACTIVATION ON A COMPUTING DEVICE

(71) Applicant: AO Kaspersky Lab, Moscow (RU)

(72) Inventor: Ivan I. Tatarinov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 647 days.

(21) Appl. No.: 16/668,144

(22) Filed: Oct. 30, 2019

(65) Prior Publication Data
US 2020/0409720 A1   Dec. 31, 2020

(30) Foreign Application Priority Data
Jun. 28, 2019 (RU) .................. 2019120231

(51) Int. Cl.
| | |
|---|---|
| *G06F 11/34* | (2006.01) |
| *G06F 3/01* | (2006.01) |
| *H04L 67/50* | (2022.01) |
| *G06F 16/338* | (2019.01) |
| *G06F 9/445* | (2018.01) |

(Continued)

(52) U.S. Cl.
CPC ............. *G06F 9/445* (2013.01); *G06F 3/011* (2013.01); *G06F 3/013* (2013.01); *G06F 3/0484* (2013.01); *G06F 11/3438* (2013.01); *G06F 16/338* (2019.01); *H04L 67/51* (2022.05); *H04L 67/535* (2022.05)

(58) Field of Classification Search
None
See application file for complete search history.

(56) References Cited

U.S. PATENT DOCUMENTS

| | | | |
|---|---|---|---|
| 9,823,742 B2 | 11/2017 | Parker et al. | |
| 2005/0221840 A1 | 10/2005 | Yamamoto et al. | |

(Continued)

OTHER PUBLICATIONS

Sajal K Das et al: "The Role of Prediction Algorithms in the Mavhome Smart Home Architecture", IEEE Wireless Communications, Coordinated Science Laboratory; Dept. Electrical and Computer Engineering; University of Illinois at Urbana-Champaign, US, vol. 9, No. 6, Dec. 1, 2002 (Dec. 1, 2002), pp. 77-84.

(Continued)

*Primary Examiner* — Christopher J Fibbi
(74) *Attorney, Agent, or Firm* — ArentFox Schiff LLP; Michael Fainberg

(57) ABSTRACT

Disclosed herein are systems and method for automatic activation of a service on a computing device. In an exemplary aspect, a service activation module may link, using an activation model, user behavioral data to an automated activation of the service based on the detecting a prior activation of the service subsequent to receiving the user behavioral data. The service activation module may receive, at a later time, additional sensor data from a plurality of sensors of a computing device. The service activation module may parse the additional sensor data to generate additional user behavioral data. The service activation module may compute, using the activation model, a degree of similarity between the user behavioral data and the additional user behavioral data, and in response to determining that the degree of similarity is greater than a predetermined threshold value, may automatically activating the service on the computing device.

17 Claims, 5 Drawing Sheets

(51) Int. Cl.
*H04L 67/51* (2022.01)
*G06F 3/0484* (2022.01)

(56) References Cited

U.S. PATENT DOCUMENTS

| | | | |
|---|---|---|---|
| 2011/0214082 A1* | 9/2011 | Osterhout | G02B 27/017 |
| | | | 715/773 |
| 2012/0290401 A1* | 11/2012 | Neven | G06V 20/20 |
| | | | 382/103 |
| 2013/0135198 A1* | 5/2013 | Hodge | H04N 21/4436 |
| | | | 345/156 |
| 2013/0145304 A1* | 6/2013 | DeLuca | G06F 3/013 |
| | | | 715/781 |
| 2014/0168056 A1* | 6/2014 | Swaminathan | G06V 30/142 |
| | | | 345/156 |
| 2014/0361996 A1* | 12/2014 | Eden | G06F 3/041 |
| | | | 345/173 |
| 2016/0004971 A1 | 1/2016 | Verkasalo | |
| 2016/0110528 A1 | 4/2016 | Gupta et al. | |
| 2016/0132290 A1 | 5/2016 | Raux | |
| 2016/0328015 A1* | 11/2016 | Ha | G06F 3/013 |
| 2018/0189354 A1* | 7/2018 | Paine | G06F 3/017 |
| 2018/0288119 A1* | 10/2018 | Lee | H04L 67/131 |

OTHER PUBLICATIONS

Brdiczka 0 et al: "Detecting Human Behavior Models From Multimodal Observation in a Smart Home", IEEE Transactions on Automation Science and Engineering, IEEE Service Center, New York, NY, US, vol. 6, No. 4, Oct. 1, 2009 (Oct. 1, 2009), pp. 588-597.

* cited by examiner

SYSTEMS AND METHODS FOR AUTOMATIC SERVICE ACTIVATION ON A COMPUTING DEVICE

CROSS-REFERENCE TO RELATED APPLICATION

This application claims benefit of priority under 35 U.S.C. 119(a)-(d) to a Russian Application No. 2019120231 filed on Jun. 28, 2019, which is incorporated by reference herein.

FIELD OF TECHNOLOGY

The present disclosure relates to the field of control systems, and more specifically, to methods of automatic activation of a service on a computing device.

BACKGROUND

The rapid development of computer technologies over the last decade, and also the prevalence of various computing devices (e.g., personal computers, notebooks, tablets, smartphones, etc.), have become a powerful stimulus to the use of such devices in many different areas of activity from surfing the Internet to performing bank transfers and circulating electronic documents.

Progress in such fields as speech recognition, machine learning, artificial intelligence and so forth has enabled a significant simplification of user interaction with computer systems, which has led, for example, to the advent of smart assistants. Smart assistants are applications that perform tasks or utilize services for the user based on information entered by the user, location data, and information obtained from various Internet resources.

One of the problems of the interaction between users and computer systems is the problem of effective activation of tasks and services on those computer systems. Conventional smart assistants rely on voice control (e.g., the recognition of sound signals equating to a key phrase or wake word) and manual control (e.g., typing in a request). But oftentimes these described methods are slow, inconvenient to use, and thereby cause annoyance to users. For example, a user may say a wake word and a smart assistant may not activate, causing the user to keep repeating the wake word until activation of the smart assistant. Because wake words are predetermined and invariable, if the user has a plurality of commands for the smart assistant, the user has to constantly repeat the wake word before each command, causing an unnatural and clunky communication between the user and the smart assistant.

There is thus a need for a method of service and application activation on a computing device without the reliance on voice command and manual inputs.

SUMMARY

Aspects of the disclosure relate to the field of control systems. In particular, aspects of the disclosure describe methods and systems for automatic activation of a service on a computing device.

In an exemplary aspect, a service activation module may receive, at a first time, sensor data from a plurality of sensors of a computing device. Subsequent to receiving the sensor data, the service activation module may detect an activation (e.g., a manual activation) of a service on the computing device. In response to detecting the activation of the service, the service activation module may parse the sensor data to generate user behavioral data and may link, using an activation model, the user behavioral data to an automated activation of the service. The service activation module may receive, at a second time, additional sensor data from the plurality of sensors of the computing device. The service activation module may parse the additional sensor data to generate additional user behavioral data. The service activation module may compute, using the activation model, a degree of similarity between the user behavioral data and the additional user behavioral data, and in response to determining that the degree of similarity is greater than a predetermined threshold value, may automatically activating the service on the computing device.

In some aspects, the activation model comprises a plurality of rules and each respective rule of the plurality of rules is for automated activation of a respective service based on respective user behavioral data.

In some aspects, the plurality of sensors comprise at least one of: an accelerometer; a gyroscope; a magnetometer; a proximity sensor; a pedometer; a camera.

In some aspects, the sensor data comprises gaze information of a user and environment information both acquired by at least one camera of the computing device. The service may be a digital search query, and the service activation module may link the user behavioral data to the automated activation of the service by identifying an object in the environment that the user was looking at for a threshold period of time based on the gaze information and the environment information, and in response to determining that the digital search query comprises a request for information about the object that the user was looking at, generating a rule, for the activation model, that initiates an automated digital search query on the computing device for any object that the user looks at for the threshold period of time.

In some aspects, the gaze information indicates that the user looked at the computing device both prior to and subsequent to looking at the object for the threshold period of time. Accordingly, the service activation module may generate an additional rule, for the activation model, that initiates the automated digital search query on the computing device for any object that the user looks at for the threshold period of time both prior to and subsequent to looking at the computing device.

In some aspects, the service activation module may receive an acknowledgement from the user subsequent to automatically activating the service on the computing device, and in response to determining that the acknowledgment comprises a negative connotation, may remove the rule from the activation model.

In some aspects, the sensor data comprises at least: the relative position of the computing device in an environment, the position of the user of the computing device in the environment relative to the computing device.

In some aspects, the user behavioral data comprises a change in position of the computing device relative to the user.

In some aspects, the service to be activated is an intelligent personal software agent (e.g., a smart assistant).

In some aspects, the service activation module may receive a user voice message without an activator phrase via the plurality of sensors of the computing device. The service activation module may trigger the smart assistant to begin analysis of the user voice message before the activation of said agent, wherein the activation comprises outputting the analysis results (e.g., an answer to a user query). The service activation module may later activate the smart assistant based on the rules of the activation model. This allows for an immediate output of results without the delays of performing an analysis subsequent to activation.

In some aspects, the service activation module may train the activation model, which may be a machine learning algorithm that monitors for user behavior data that matches a particular rule and activates a service accordingly.

In some aspects, the degree of similarity of the behavioral data being analyzed is a numerical value characterizing the probability that said behavioral data being analyzed corresponds to user behavioral data required for the activation of a particular service on the computing device.

In some aspects, after the activation of the service, the service activation module may retrain the activation model such that during subsequent analysis of any additional sensor data, the degree of similarity of any generated user behavioral data and historic behavioral data is higher than in the present case.

In some aspects, the sensor data and the additional sensor data are received from a plurality of computing devices, wherein the plurality of computing devices comprises the computing device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for automatic activation of a service on a computing device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
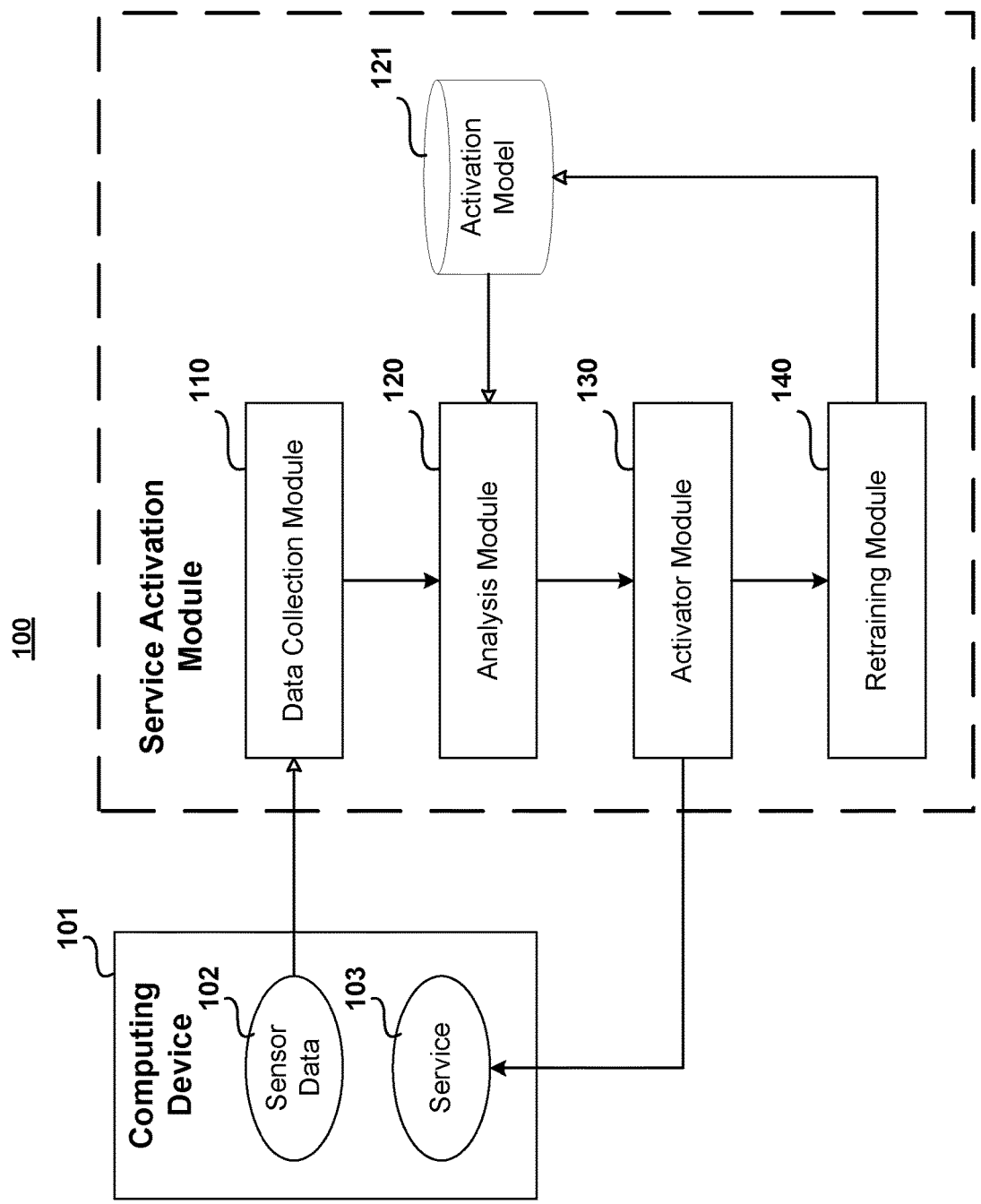
FIG. 1 shows a block diagram of a system depicting a service activation module, in accordance with aspects of the present disclosure.

FIG. 1 shows a block diagram of system 100 depicting a service activation module, in accordance with aspects of the present disclosure. The structural diagram of system 100 for automatic service activation comprises a computing device 101, sensor data 102, service 103, and a service activation module comprising data collection module 110, analysis module 120, activation model 121, activator module 130, and retraining module 140. Service activation module may be executed on computing device 101 or an external server.

The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (e.g., computing device 101). Accordingly, each module may be realized in a variety of suitable configurations, and should not be limited to any particular implementation exemplified herein.

Data collection module 110 is configured to (1) obtain sensor data 102 from a plurality of sensors of computing device 101, (2) generate user behavioral data, which may describe a change in the parameters of computing device 101 during a predetermined time, based on sensor data 102, and (3) send the user behavioral data to analysis module 120.

In some aspects, computing device 101 is one of: a smartphone, a mobile smartphone, a tablet, a computer, an electronic book reading device, or any computing device having sensors determining physical characteristics of the computing device (e.g., G-sensors, accelerometers, etc.) or the surroundings of the computing device (e.g., video cameras, microphones, etc.), including smart home elements, household appliances, and so forth.

In some aspects, data collection module 110 is configured to obtain sensor data 102 from a plurality of computing devices. For example, data collection module 110 may receive image data from a camera of a smartphone and voice data captured by a microphone of a smart speaker.

In some aspects, service 103 can operate locally on computing device 101 locally (e.g., as a local application, including applications for biometric identification of users) or remotely (e.g., as a cloud application). Launching (used interchangeably with activating) service 103 on computing device 101 may require an activation, which can be done at least by an activator phrase, which is a voice command given by a user, upon recognition of which the system launches a service. An activator phrase may be a wake word or wake phrase. In some aspects, service 103 may be launched by performing of nonverbal actions of the user or by analyzing the surroundings of computing device 101.

For example, an intelligent personal software agent (e.g., a smart assistant such as Alice™, Alexa™, Siri™, etc.) may work on a smartphone, and in order to activate the smart assistant, the user needs to perform certain actions on the smartphone including saying a voice command (with a wake word), touching the screen, placing the smartphone in a vertical position, and so forth.

In some aspects, the plurality of sensors of computing device 101 are at least one of: an accelerometer, a gyroscope, a magnetometer, a proximity sensor, a pedometer, a microphone, a camera.

A command for launching a service may be at least one of: (1) a voice command of the user (with an activator phrase), which is recorded by the microphone of computing device 101, (2) a gesture of the user, performed without computing device 101, which is recorded by the video camera of computing device 101, (3) a gesture of the user, performed together with computing device 101, which is recorded by the various sensors of the positioning of the computing device (G-sensor, accelerometer, etc.), (4) a change in the parameters of the surroundings, including a determination of the physical environment of the user, performed with the aid, inter alia, of the microphone, the video camera, the positioning sensors of computing device 101 and so forth and a determination of the virtual (network) environment of the user, performed by a Wi-Fi module, a Bluetooth model, the cellular communication module of computing device 101 and so forth.

For example, in order to determine the activator phrase, the microphone of computing device 101 is used. In order to determine a change in the position of computing device 101, the accelerometer is used. In order to determine the focus of attention of the user (for example, to determine the line of sight on computing device 101) the camera is used, and so forth.

In some aspects, sensor data 102 received from the plurality of sensors of computing device 101 comprises: audio data received from the microphone, video data received from the video camera, positioning data (coordinates, etc.) received from the sensors of a global positioning system, data on mobile communication stations, data on Bluetooth devices situated alongside computing device 101, data on Wi-Fi networks in whose zone of operation computing device 101 is located, data on the position of computing device 101 in an environment (e.g., captured by a depth sensor that forms a point cloud of three-dimensional points, or received from a G-sensor (angle of inclination, etc.)), and data on the acceleration of movement of computing device 101, received by an accelerometer.

In some aspects, the parameters of computing device 101 include the relative position of computing device 101 in space (i.e., a vector representation of the physical environment of computing device 101 in virtual Cartesian space, where the origin point at a given moment of time may be a position of computing device 101, and the space includes the position of the user, the position of the closest different computing device, the position of a different computing device with the highest Wi-Fi signal level, etc.). The parameters may also include the position of the user of computing device 101 in space relative to computing device 101 (e.g., in the virtual Cartesian space).

A change in the parameters of the surroundings of computing device 101 (i.e., the parameter is a characteristic of a change in specified parameters, such as a principal parameter—the acceleration of computing device 101 (obtained from the accelerometer), and an auxiliary parameter—the rate of change in that acceleration, making it possible to determine the direction of displacement of computing device 101 and so forth), where said change in parameters may be at least (1) the rate of change in specified parameters, (2) the frequency of change in specified parameters and (3) the functional relation of the changing parameters with each other (in the case of a change in at least two parameters, such as the distance to the computing device with the highest level of Wi-Fi signal and the level of the Wi-Fi signal).

In some aspects, the parameters of the surroundings are at least the noise level, the lighting level, the humidity, the level of the signal from cellular stations, and GPS marks.

For example, the relative position of computing device 101 in space (relative to a given object, such as the user or the computing device with the highest level of Wi-Fi signal), can be determined by analysis module 120 based on the data of an accelerometer, a gyroscope, and sensors able to track the direction of displacement of computing device 101, the acceleration of displacement of computing device 101, and so on.

In yet another example, the position of the user of computing device 101 in space relative to computing device 101 can be determined by analysis module 120 based on the data of the microphone (e.g., from the loudness level of sound), the camera (e.g., analysis of a video image), the proximity sensor, and so forth.

In yet another example, the parameters of the surroundings can be determined by a microphone (e.g., noise level), a camera (e.g., lighting level), a proximity sensor, a magnetometer, a pedometer, and so on.

In some aspects, the change in position of computing device 101 relative to the user is determined based on an analysis of sensor data 102 about what the user is viewing, obtained from the camera of computing device 101. Data collection module 110 may collect images from the camera of computing device 101 and analysis module 120 may analyze the images (e.g., perform object recognition to identify faces or facial elements (eyes, nose, etc.)). Analysis module 120 may construct the three-dimensional position of the face relative to a display of computing device 101 and determine the directional vector of a user's gaze relative to computing device 101.

In the described example, not only is the relative position of computing device 101 and the user evaluated, but the focus of attention (used interchangeable with the gaze) of the user (i.e., the object which the user is looking at) is determined. In some aspects, analysis module 120 may determine that a service should be activated if computing device 101 is at a distance not greater than a predetermined distance from the object and if the user stares at the object for at least a threshold period of time.

Besides data directly from the sensors of computing device 101, the dynamics of change in time of the obtained data are also gathered and analyzed. Such changes may involve changes in time of (1) the acceleration of computing device 101, (2) the position of computing device 101, (3) the noise level around computing device 101, (4) the lighting level around computing device 101, (5) the Wi-Fi signal level of a given computing device 101, (6) the number of computing devices next to a given computing device 101 or the number of computing devices with a Wi-Fi signal level higher than a given value.

Based on the changes in parameters, it is possible for analysis module 120 to determine more accurately the various characteristics of the behavior of the user, the change in the surroundings/environment of computing device 101 and the change in the condition of computing device 101.

For example, information about the noise level (e.g., being a numerical value such as decibels) can be obtained either once or over the course of a given time, and thus the periodically collected data can additionally provide information as to a change in noise level, which may be interpreted as the user moving away from computing device 101.

In some aspects, data collection module 110 may collect sensor data 102 from the sensors of other computing devices. For example, during the analysis of sensor data 102, in order to make a decision on the activation of service 103 on computing device 101, data collection module 110 may collect data from other computing devices located in the immediate vicinity (for example, in the same room) as computing device 101, whereby the data may be sent directly from one computing device to another by Bluetooth, Wi-Fi or the Internet.

Based on the collected information from the other computing devices, each of which can collect data about its own immediate surroundings, analysis module 120 may construct a virtual representation of the physical environment of computing device 101 much more accurately than if the given computing device was alone.

For example, using the level of the Wi-Fi signal from several computing devices it is possible to construct a physical chart of the room in which those computing devices are located, even down to the arrangement of the walls and furniture (not identifying precisely what everything is, but only on the level of signal propagation interference).

In some aspects, historic behavioral data for activating service 103 on computing device 101 is similar to the data from the camera of computing device 101 (e.g., the aggregate of images taken in which the user's face is captured), characterizing the condition of the user whereby the user stares at computing device 101 for at least a specified time.

For example, even though the fact of looking at computing device 101 may be registered repeatedly and regularly, only a glance staring at the computing device for longer than a given interval of time (such as longer than 5 seconds) will henceforth be used (for example, as an activator command to launch a service on computing device 101). For example, a tablet may be situated on its stand on a table, and the user regularly, but fleetingly (i.e., not for a lengthy time) looks at the table. All of these actions of the user are tracked by the camera on the tablet and analyzed, yet no command to launch a service is given until such time as the user looks at the tablet for longer than 5 seconds.

In some aspects, the service activation module may receive a user voice message without an activator phrase via the plurality of sensors of the computing device. The service activation module may trigger a smart assistant to begin analysis of the user voice message before the activation of said agent, wherein the activation comprises outputting the analysis results (e.g., an answer to a user query). The service activation module may later activate the smart assistant based on the rules of the activation model. This allows for an immediate output of results without the delays of performing an analysis subsequent to activation (e.g., similar to the benefits of a cache where certain information is kept readily available).

Analysis module 120 is configured to analyze user behavioral data using activation model 121. Activation model 121 may comprise a plurality of rules, based on which a decision is made as to triggering activation of service 103. Activation model 121 may further determine a degree of similarity between user behavioral data and historic behavioral data which has been previously selected as a condition for activation of service 103 on computing device 101. Activator module 130 may determine whether the degree of similarity is greater than a predetermined threshold value, whereby a positive result of that analysis is obtained in the event that the degree of similarity so determined is higher than a given threshold value.

In some aspects, historic behavioral data in activation model 121 has been generated as a result of machine learning of said activation model 121.

For example, prior to the use of the described system on a computing device 101, data is collected by another computing device characterizing the actions of the user involving the activation of a service on computing device 101 (such as bringing the smartphone up to one's face). Based on the collected data from the sensors of computing device 101, activation model 121 is taught so that similar user actions performed afterwards for the activation of service 103 (such as those involving bringing the computing device up to the user's face) could be identified by activation model 121 with greater than a given accuracy.

In some aspects, activation model 121 is taught at least with data describing any combination of the user's speech, the user's gestures, handwritten input by the user, and graphic images.

In some embodiments, the behavioral data being analyzed and the historic behavioral data are generated based on data obtained from various types of sensors of computing device 101, and characterize different types of data: audio data, data about the surroundings, data on verbal and nonverbal actions of the user, data about the computing devices 101 in the vicinity (designations of models, access codes for sending data between the computing devices 101, characteristics of the computing devices 101, data about the software running on the computing devices 101) and so forth.

For example, it is possible to use data from the camera of computing device 101 to generate the behavioral data, based on which the user is identified by his or her face, and data from the G-sensor of the computing device may be used for characterizing the displacement in space of computing device 101 by the user (which is determined by data on the relative position of computing device 101 and the user, and also on the position, directly, of computing device 101 itself).

In some aspects, the degree of similarity of the behavioral data being analyzed and the historic behavioral data (belonging to the same type, such as data describing voice activation or data describing an activation by module of gestures) is a numerical value characterizing the probability that said behavioral data being analyzed corresponds to a change in the parameters of computing device 101 which is required for the activation of service 103 on computing device 101.

For example, the degree of similarity of the behavioral data being analyzed and the historic behavioral data may be a numerical value from 0 to 100, where 0 characterizes the fact that the behavioral data being analyzed completely differs from the historic behavioral data (for example, said data was obtained with the user moving computing device 101 in a very different way from the standard movement of bringing computing device 101 up to the user's face), and 100 characterizes the fact that the behavioral data being analyzed full matches the historic behavioral data. The aforementioned analysis may be mathematically described as a kind of activation function.

In some aspects, service 103 is triggered for activation by activator module 130 in the event that the degree of similarity determined for the behavioral data being analyzed exceeds a given threshold value. For example, if the degree of similarity exceeds 80% (when the degree of similarity is measured as a percentage), then the behavioral data being analyzed is considered to be similar to the historic behavioral data, and the actual actions performed with computing device 101 are considered to be similar (including also identical) to the historic actions performed with computing device 101.

In yet another example, if the user staring at computing device 101 (determined based on data obtained from the camera of computing device 101) is used as the action, then the degree of similarity is higher the longer the user stares at computing device 101 and after a predetermined time (such as 5 seconds).

In yet another example, an activator phrase is used for the activation of the service on computing device 101. In this case, a comparison is made of a standard phrase embedded in activation model 121 and a phrase recorded by computing device 101 by a microphone. If the degree of similarity of the amplitude-frequency signals of the phrase being analyzed and the standard phrase is greater than a predetermined threshold value, the phrases are considered to be identical and activation model 121 is triggered. The comparison of the phrase being analyzed and the standard phrase may be done by any method known in the prior art, including by analysis of tone, timbre, and other characteristics of audio data (e.g., using a sound classifier such as Shazam™).

Activator module 130 is configured to activate service 103 on computing device 101 in the event of a positive result of the analysis performed. The result of the analysis performed may be either positive—when the actions of the user correspond to the actions specified for activation of service 103, or negative—when the actions of the user do not correspond to the actions specified for activation of service 103.

In some aspects, after making a decision as to the activation of service 103, a verbal reaction from the user is awaited to confirm the decision so made. For example, after the activation of service 103, the computing device will recognize an additional command given by the user (for example in the form of an additional activator phrase).

Consider a scenario featuring the search service of Google™. The standard form of operation for a verbal activation consists in the user pronouncing the activator phrase "OK Google," after which the user states the request to be performed by the search service. In this scenario, a somewhat modified sequence will occur:

Step 1: The user brings the smartphone up to his or her face. After the user has brought the smartphone up to his or her face, an activation of the search service will occur, and the voice request of the user will be recorded and sent to the server for execution.

Step 2: The user pronounces the additional activator phrase. After the user has pronounced the activator phrase "OK Google," the result of the voice request is outputted from the server (given that the server has not previously output the request, which will depend on the speed of processing of the request, the workload of the server, and so forth.

Step 3: The user obtains the result of the request on a display or through audio feedback.

In some aspects, any of the above described activators (a phrase, an action performed by the user, the result of an analysis of the gaze of the user, and so forth) may be used as an additional (verifying) activator of service 103 on computing device 101.

In some aspects, the decision on activation of service 103 after an additional (verifying) action of the user is not made until activation model 121 has been taught well enough that the number of errors (i.e., when the activation of the service is in error and the activation is followed by a command from the user to cancel the launching of service 103) becomes less than a predetermined threshold value.

Retraining module 140 is configured to retrain activation model 121 such that, during the next analysis of the generated behavioral data, the degree of similarity of the generated behavioral data to the historic behavioral data, corresponding to bringing computing device 101 into a predetermined position (which is recognized as an activation command for service 103), is higher than in the present case.

In some aspects, after the verbal activation of service 103 by the user, activation model 121 is retrained such that at least the decision on activation of service 103 agrees with the verbal reaction of the user and the probability of errors of the first and second kind during the activation of the service is reduced (these errors are determined based on an analysis of known errors in the processing of sensor data 102 from the sensors of the computing device, for example, the errors in the recognizing of images or voice commands are known in advance.

Consider a scenario in which computing device 101 is a smartphone of a user. Service 103 may be a personal software agent such as a smart assistant software embedded in a robot. The smart assistant may receive user speech inputs and may convert the inputs to digital search queries (e.g., on Google search).

In the present example, the user after having decided to submit a request to service 103 brings the smartphone 101 up to their face and pronounces the request (e.g., "what is the address of the nearest restaurant?"). The system being described, which is configured to determine the requests of a user and to execute those requests, collects data by data collection module 110 from the various sensors of the smartphone 101, such as the G-sensor, the accelerometer, the microphone, and so forth, performs a preliminary processing of the data (the main goal of which is to suppress noise, an amplitude-frequency analysis, for example using Fourier transforms, and so forth) and an analysis (clustering of the data based on predetermined patterns, the selection of which data will henceforth be used to determine the actions of the user, and so on), the relationship of the obtained data with each other regarding the time of receiving the data (for example, data received at time to from the accelerometer and the G-sensor may be combined into a sequence describing the relative displacement of the smartphone 101 in space), and so on.

After the data has been collected (basically the process of data collection and analysis may take place continually and the analysis can be made based on data collected in the past few seconds), analysis module 120 is used to perform an analysis of the data and a determination is made as to whether the data characterizes an activation of service 103 (i.e., is the data being analyzed similar to the standard data previously determined and obtained from a certain "ideal" action of the user, corresponding to an activation of service 103). The collected data is configured as an aggregate of several signals over time, wherein the data from each sensor may be represented as individual signals, and can be combined into a single signal from different sensors (as was described above). After this, a comparison is made of the generated signals and the standard signal which has been previously generated based on a large sample of data obtained from smartphones brought up to the face by users (i.e., historic user behavioral data comprising historic actions). The comparison itself is done by a trained activation model 121. As a result of the comparison, activation model 121 outputs a degree of similarity (i.e., a numerical value characterizing how much the generated signals and the standard signal are similar). In the present example, the degree of similarity may be ξ=0.93.

After the previously obtained data has been analyzed and it has been determined that the user action characterized by the data is similar to a historic action (ξ=0.93, ξ$_{threshold}$=0.85) (this attribute may be defined as a kind of "trigger threshold"—the numerical value upon reaching which the described system makes a decision as to the need to activate service 103), a decision is made to activate service 103. After the activation of service 103, the recording mode for a voice request is additionally turned on for later analysis thereof. Activator module 130 sends the voice request received (and saved) to service 103, which recognizes the speech (or dispatches the digitized speech to a server or to the cloud for recognition by the module of the server), sends the recognized request to the server, receives a response, and configures this in convenient form for the user (for example, showing the marker of a restaurant on a map displayed on the screen of the smartphone).

If for some reason the actions of the user have been misinterpreted, and the user states the blocking phrase "Cancel", then the previously collected data will be sent to retraining module 140, and retraining module 140 in turn will train activation model 121 so that, upon comparing the above described signals with standard ones, the degree of similarity is less than the threshold value and the activation of service 103 will not be triggered, (for example, ξ$_{taught}$=0.93, ξ$_{threshold}$=0.85).

Figure 2:
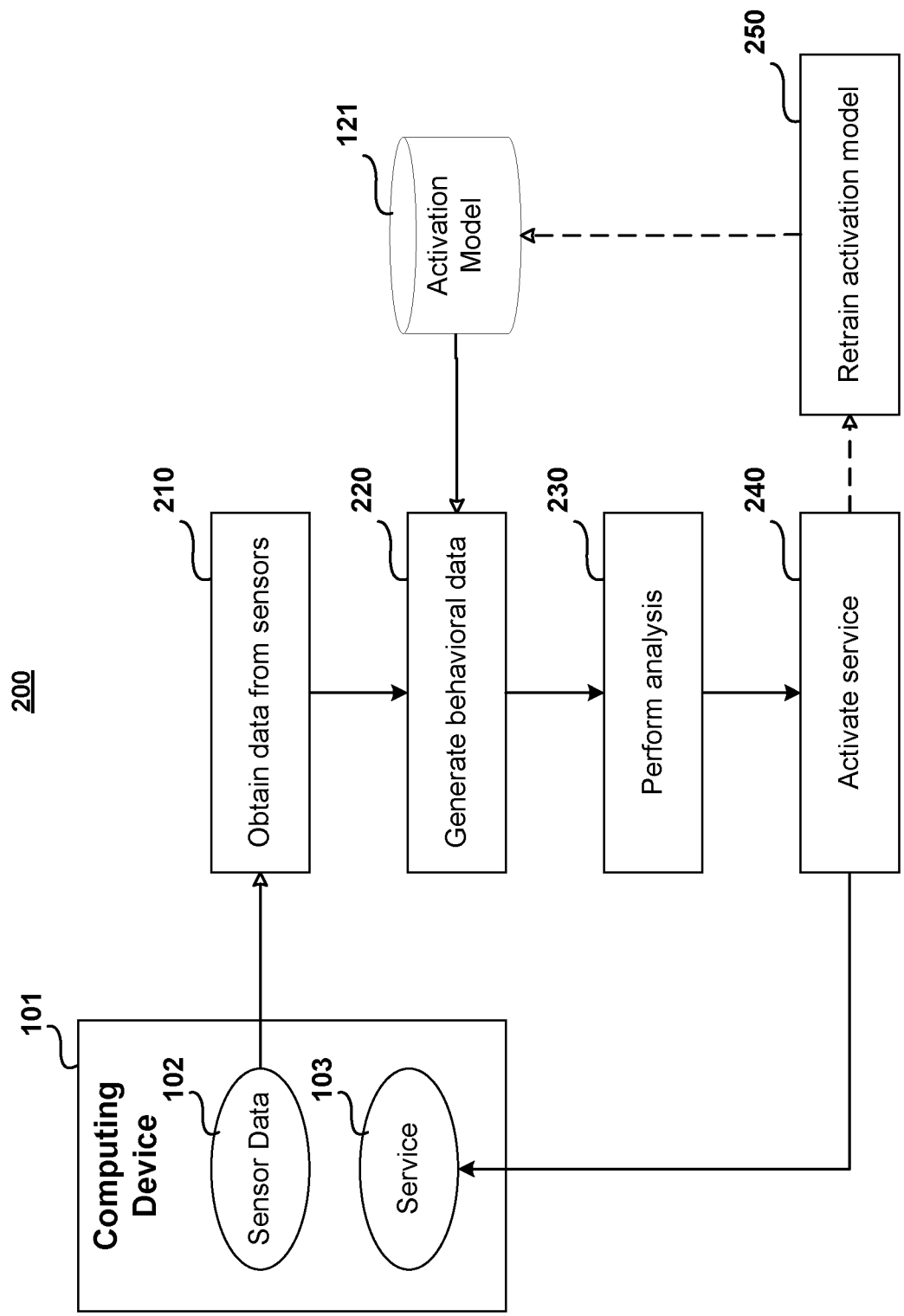
FIG. 2 illustrates a flow diagram of a method utilizing the service activation module, in accordance with aspects of the present disclosure.

FIG. 2 illustrates a flow diagram of method 200 utilizing the service activation module, in accordance with aspects of the present disclosure. The structural diagram of the method of nonverbal activation of a service on a computing device contains a step 210 during which data is obtained from the sensors of the computing device, a step 220 during which behavioral data is generated, a step 230 during which an analysis is performed, a step 240 during which the service is activated, and a step 250 during which the activation model is retrained.

At 210, data 102 is obtained from sensors of computing device 101 by data collection module 110.

At 220, data is generated by analysis module 120 as to the behavior of computing device 101 (hereinafter, behavioral data), describing a change in the parameters of computing device 101 during a predetermined time, based on sensor data 102 received from the sensors.

At 230, an analysis of the behavioral data is performed by analysis module 120 using a trained activation model 121, wherein the activation model may determine the degree of similarity of the behavioral data so analyzed to historic behavioral data, based on which a decision is made as to the triggering of service 103.

At 240, in response to determining that the degree of similarity is greater than a predetermined threshold value, activator module 130 activates service 103 on computing device 101.

At 250, retraining module 140 may receive feedback from the user indicating whether the user approved or disapproved of the automatic activation of service 103. Retraining module 140 may then retrain activation model 121 so that during the next analysis of generated user behavioral data, the degree of similarity between the generated behavioral data and the historic behavioral data is increased/decreased based on the feedback received from the user.

Figure 3:
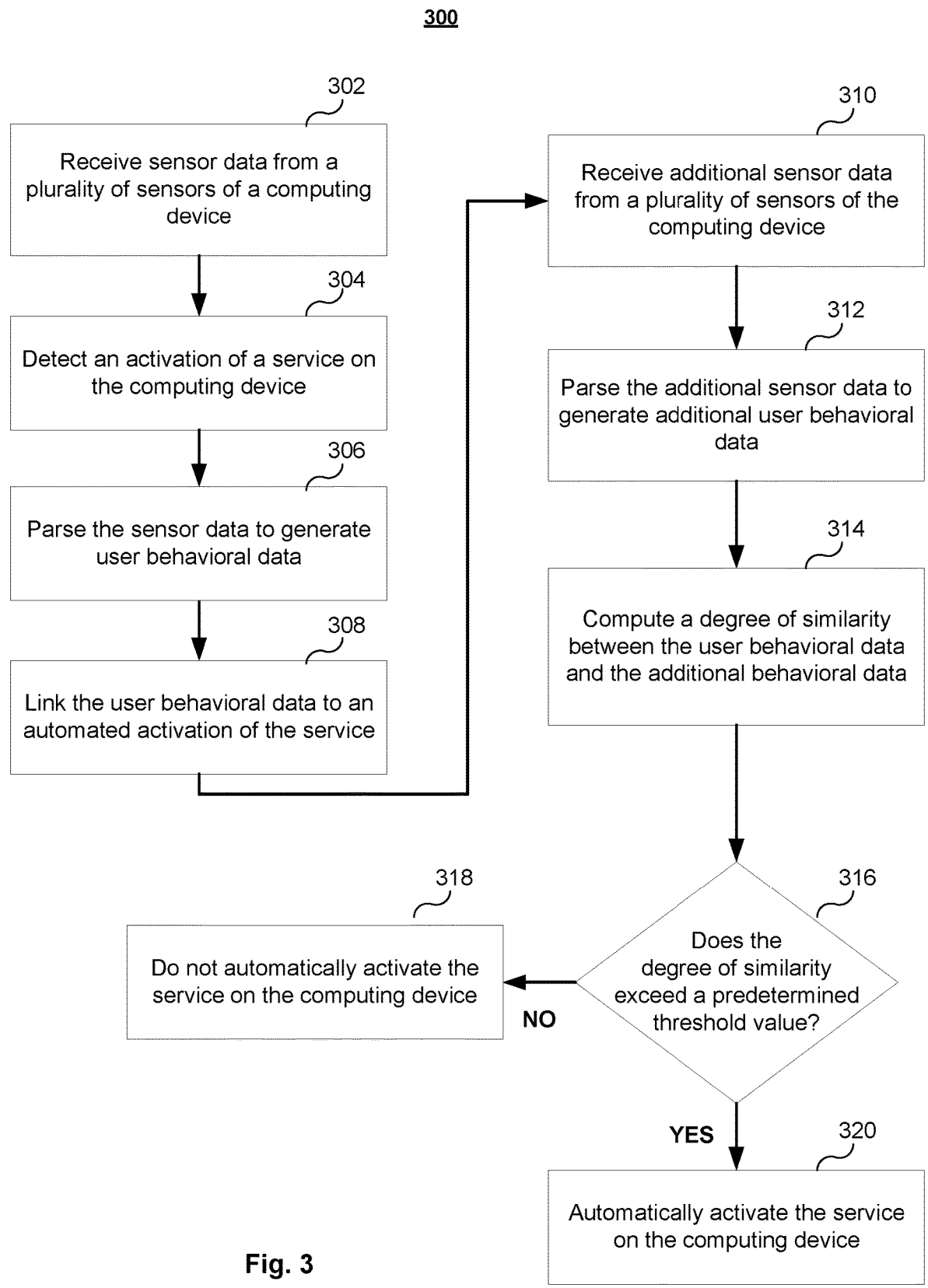
FIG. 3 illustrates a flow diagram of a method for automatic activation of a service on a computing device, in accordance with aspects of the present disclosure.

FIG. 3 illustrates a flow diagram of method 300 for automatic activation of a service on a computing device, in accordance with aspects of the present disclosure. At 302, data collection module 110 may receive sensor data 102 from a plurality of sensors of computing device 101. At 304, the service activation module may detect a activation of service 103 (e.g., a smart assistant) on the computing device. For example, a user may manually activate the smart assistant using a wake word or a touch/mouse input on computing device 101.

At 306, analysis module 120 may parse the sensor data to generate user behavioral data. At 308, analysis module 120 may link, in activation model 121, the user behavioral data to an automated activation of service 102.

At 310, data collection module 110 may receive additional sensor data from a plurality of sensors of computing device 101. At 312, analysis module 120 may parse the additional sensor data to generate additional user behavioral data. At 314, activation model 121 may compute a degree of similarity between the user behavioral data and the additional behavioral data. At 316, activator module 130 may determine whether the degree of similarity exceeds a predetermined threshold value. If activator module 130 determines that the degree of similarity does exceed the predetermined threshold value, method 300 advances to 320, where activator module 130 may automatically activate service 103 on computing device 101. However, if activator module 130 determines that the degree of similarity does not exceed the predetermined threshold value, method 300 advances to 318, where activator module 130 may not activate service 103 on computing device 101.

Figure 4:
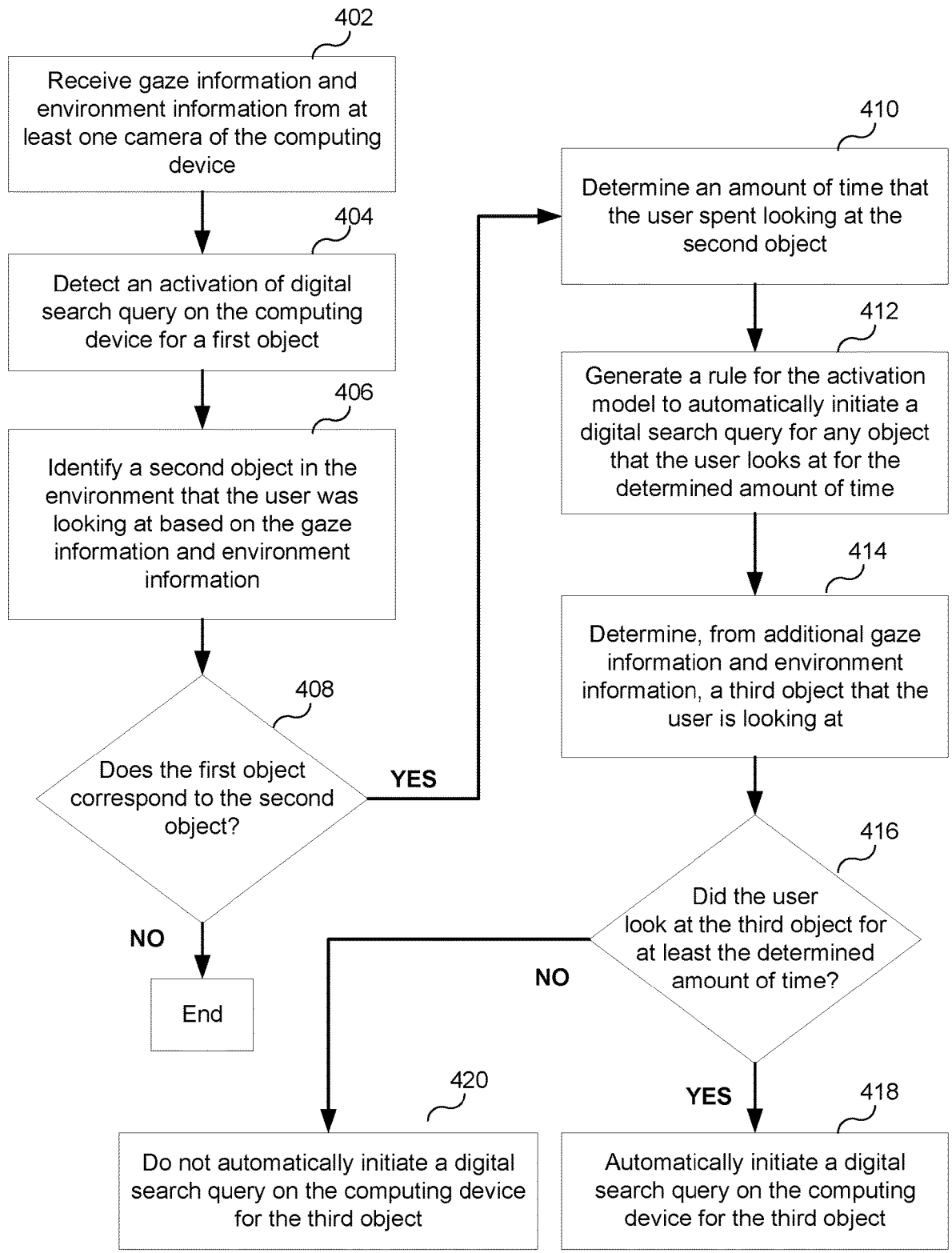
FIG. 4 illustrates a flow diagram of a method for automatic activation of a digital search query on a computing device, in accordance with aspects of the present disclosure.

FIG. 4 illustrates a flow diagram of method 400 for automatic activation of a digital search query on a computing device, in accordance with aspects of the present disclosure. At 402, data collection module 110 may receive gaze information and environment information from at least one camera of computing device 101. Consider a scenario where a user is accessing a smartphone. The gaze information may comprise images of a user's eyes as captured by the front-facing camera of the smartphone. The environment information may comprise images of the surroundings of the user and the smartphone, as captured by both the front and rear cameras of the smartphone. At 404, the service activation module detects a activation of a digital search query on computing device 101 for a first object. For example, the user may manually activate a smart assistant using a wake word and may request information about a car model.

At 406, analysis module 120 may identify a second object in the environment that the user was looking at based on the gaze information and environment information. For example, using object recognition techniques (e.g., as defined in an image processing library or a machine learning object classifier), analysis module 120 may identify a plurality of objects in the images of the environment (e.g., a garage). Analysis module 120 may further correlate a gaze image and an environment image by their respective timestamps to determine where the eyes of the user in the gaze image are looking in the environment based on a spatial analysis which involves depth approximations and vectorising the gaze of the user's eyes. Analysis module 120 may determine that in the plurality of gaze images comprised in the gaze information, the user is looking at the second object.

At 408, analysis module 120 determines whether the first object corresponds to the second object. For example, analysis module 120 may determine whether the user was looking at a car. In response to determining that the first object and second object are not cars, method 400 ends. However, if analysis module 120 determines that the second object is a car (i.e., the object that the user activated the smart assistant to search for), method 400 advances to 410, where analysis module 120 may determine an amount of time that the user spent looking at the second object. For example, analysis module 120 may determine that the user spent 5 seconds looking in the direction of the car based on the number of gaze images collected. In this case, the user behavioral data indicates that the user was looking at an object for 5 seconds, which motivated the user to request information about the object using the smart assistant.

At 412, analysis module 120 may generate a rule for activation model 121 to automatically initiate a digital search query for any object that the user looks at for the determined amount of time. In some aspects, analysis module 120 may also note that the user shifted his/her gaze to the object from computing device 101, spent a certain amount of time looking at the object, and then returned his/her gaze to computing device 101. This prevents situations in which the user looks at an object for the determined amount of time and the service is activated before the user even looks back at computing device 101. As a result, the rule further requires that the user return to looking at computing device 101, before the automatic activation of the service.

At 414, analysis module 120 may determine, from additional gaze information and environment information received at a later time, a third object that the user is looking at. For example, the user may be looking at another car or at a completely different object such as a boat. At 416, analysis module 120 determines whether the user looked at the third object for at least the determined amount of time (e.g., at least 5 seconds). In response to determining that the user did indeed spend at least the determined amount of time at the third object, method 400 advances to 418, where activator module 130 may automatically initiate a digital search query on the computing device for the third device (e.g., request the smart assistant to provide information about the boat). Otherwise, at 420, activator module 130 may refrain from initiating the digital search query.

In some aspects, subsequent to the automatic activation, data collection module 110 may receive an acknowledgement from the user. The acknowledgement may be an interaction with the service (e.g., a touch/mouse input, a verbal statement, etc.). Retraining module 140 may then determine whether the acknowledgment comprises a negative connotation. A negative connation may be an indication that the user did not want to see the information about the third object. For example, the user may dismiss the service in less than a threshold period of time (i.e., a minimum amount of time for looking at the service to indicate that the user in fact was interested in the information) by a touch/mouse input or a verbal command.

Based on negative connotation, retraining module 140 may alter the rules of activation model 121. For example, retraining module 140 may modify the rule that activated the digital search query to only initiate the digital search query if the user is looking at the first object (i.e., the car) rather than any arbitrary object (e.g., a boat).

Figure 5:
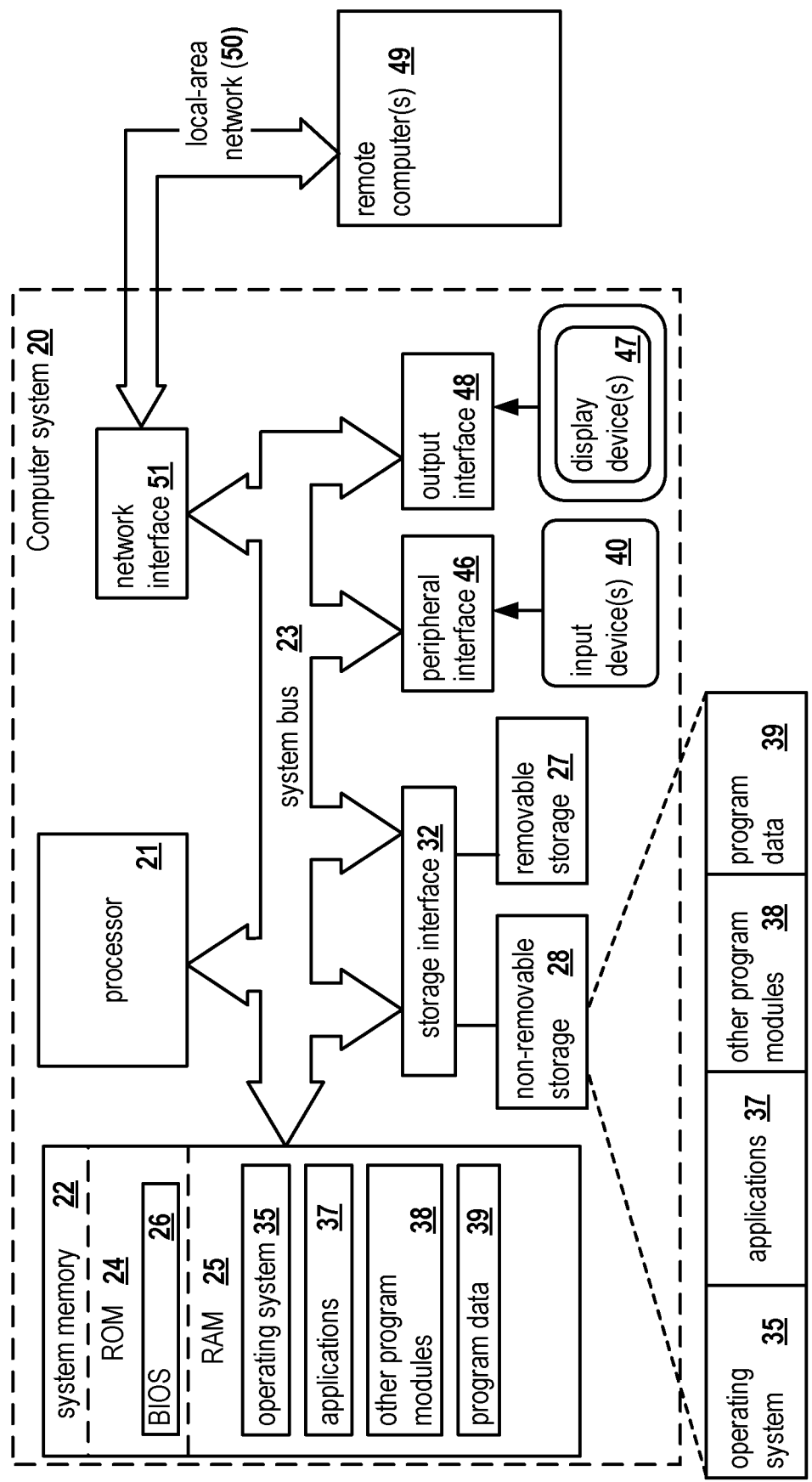
FIG. 5 presents an example of a general-purpose computer system on which aspects of the present disclosure can be implemented.

FIG. 5 is a block diagram illustrating a computer system 20 on which aspects of systems and methods for automatic activation of a service on a computing device may be implemented in accordance with an exemplary aspect. The computer system 20 may represent computing device 101 of FIGS. 1 and 2, and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for automatic service activation, the method comprising:
receiving, at a first time by an activation model comprising a plurality of rules, each respective rule being for automated activation of a respective service based on respective user behavioral data, sensor data from a plurality of sensors of a computing device, wherein the sensor data comprises gaze information of a user and environment information;
subsequent to receiving the sensor data, detecting a manual activation of a service on the computing device, wherein the service is a digital search query;
in response to detecting the manual activation of the service:
parsing, by the activation model, the sensor data to generate user behavioral data; and
linking, using the activation model, the user behavioral data to an automated activation of the service by:
identifying an object in the environment that the user was looking at for a threshold period of time based on the gaze information and the environment information; and in response to determining that the digital search query comprises a request for information about the object that the user was looking at, generating a rule, for the activation model, that initiates an automated digital search query, on the computing device for any object that the user looks at for a threshold period of time;

receiving, at a second time by the activation model, additional sensor data from the plurality of sensors of the computing device;

parsing, by the activation model, the additional sensor data to generate additional user behavioral data;

computing, using the plurality of rules of the activation model, a degree of similarity between the user behavioral data and the additional user behavioral data; and in response to determining that the degree of similarity is greater than a predetermined threshold value, automatically activating the service on the computing device after the user returns from looking at the object to looking at the computing device.

2. The method of claim 1, wherein the activation is a manual activation from a user.

3. The method of claim 1, wherein the plurality of sensors comprise at least one of: an accelerometer; a gyroscope; a magnetometer; a proximity sensor; a pedometer; and a camera.

4. The method of claim 1, further comprising:
generating an additional rule, for the activation model, that initiates the automated digital search query on the computing device for any object that the user looks at for the threshold period of time both prior to and subsequent to looking at the computing device.

5. The method of claim 1, further comprising:
receiving an acknowledgement from the user subsequent to automatically activating the service on the computing device; and
in response to determining that the acknowledgment comprises a negative connotation, removing a rule from the activation model.

6. The method of claim 1, wherein the sensor data and the additional sensor data are received from a plurality of computing devices, wherein the plurality of computing devices comprises the computing device.

7. A system for automatic service activation, the system comprising a hardware processor configured to:
receive, at a first time by an activation model comprising a plurality of rules, each respective rule being for automated activation of a respective service based on respective user behavioral data, sensor data from a plurality of sensors of a computing device, wherein the sensor data comprises gaze information of a user and environment information;
subsequent to receiving the sensor data, detect a manual activation of a service on the computing device, wherein the service is a digital search query;
in response to detecting the manual activation of the service:
parse, by the activation model, the sensor data to generate user behavioral data; and
link, using the activation model, the user behavioral data to an automated activation of the service by:
identifying an object in the environment that the user was looking at for a threshold period of time based on the gaze information and the environment information; and
in response to determining that the digital search query comprises a request for information about the object that the user was looking at, generating a rule, for the activation model, that initiates an automated digital search query, on the computing device for any object that the user looks at for a threshold period of time;

receive, at a second time by the activation model, additional sensor data from the plurality of sensors of the computing device;

parse, by the activation model, the additional sensor data to generate additional user behavioral data;

compute, using the plurality of rules of the activation model, a degree of similarity between the user behavioral data and the additional user behavioral data; and in response to determining that the degree of similarity is greater than a predetermined threshold value, automatically activate the service on the computing device after the user returns from looking at the object to looking at the computing device.

8. The system of claim 7, wherein the activation is a manual activation from a user.

9. The system of claim 7, wherein the plurality of sensors comprise at least one of: an accelerometer; a gyroscope; a magnetometer; a proximity sensor; a pedometer; and a camera.

10. The system of claim 7, wherein the hardware processor is further configured to:
generate an additional rule, for the activation model, that initiates the automated digital search query on the computing device for any object that the user looks at for the threshold period of time both prior to and subsequent to looking at the computing device.

11. The system of claim 7, wherein the hardware processor is further configured to:
receive an acknowledgement from the user subsequent to automatically activating the service on the computing device; and
in response to determining that the acknowledgment comprises a negative connotation, remove a rule from the activation model.

12. The system of claim 7, wherein the sensor data and the additional sensor data are received from a plurality of computing devices, wherein the plurality of computing devices comprises the computing device.

13. A non-transitory computer readable medium storing thereon computer executable instructions for automatic service activation, comprising instructions for:
receiving, at a first time by an activation model comprising a plurality of rules, each respective rule being for automated activation of a respective service based on respective user behavioral data, sensor data from a plurality of sensors of a computing device, wherein the sensor data comprises gaze information of a user and environment information;
subsequent to receiving the sensor data, detecting a manual activation of a service on the computing device, wherein the service is a digital search query;
in response to detecting the manual activation of the service:
parsing, by the activation model, the sensor data to generate user behavioral data; and
linking, using the activation model, the user behavioral data to an automated activation of the service by:
identifying an object in the environment that the user was looking at for a threshold period of time based on the gaze information and the environment information; and in response to determining that the digital search query comprises a request for information about the object that the user was looking at, generating a rule, for the activation model, that initiates an automated digital search query, on the computing device for any object that the user looks at for a threshold period of time;

receiving, at a second time by the activation model, additional sensor data from the plurality of sensors of the computing device;

parsing, by the activation model, the additional sensor data to generate additional user behavioral data;

computing, using the plurality of rules of the activation model, a degree of similarity between the user behavioral data and the additional user behavioral data; and in response to determining that the degree of similarity is greater than a predetermined threshold value, automatically activating the service on the computing device after the user returns from looking at the object to looking at the computing device.

14. The non-transitory computer readable medium of claim 13, wherein the activation is a manual activation from a user.

15. The non-transitory computer readable medium of claim 13, wherein the plurality of sensors comprise at least one of: an accelerometer; a gyroscope; a magnetometer; a proximity sensor; a pedometer; and a camera.

16. The non-transitory computer readable medium of claim 13, the instructions further comprising instructions for:

generating an additional rule, for the activation model, that initiates the automated digital search query on the computing device for any object that the user looks at for the threshold period of time both prior to and subsequent to looking at the computing device.

17. The non-transitory computer readable medium of claim 13, further comprising instructions for:

receiving an acknowledgement from the user subsequent to automatically activating the service on the computing device; and in response to determining that the acknowledgment comprises a negative connotation, removing a rule from the activation model.

\* \* \* \* \*